United States Patent Office 3,210,326
Patented Oct. 5, 1965

3,210,326
SELF EXTINGUISHING ALKENYL AROMATIC POLYMERIC COMPOSITIONS CONTAINING BROMOPHENYL ACRYLATES AND DIBROMOPROPYL ACRYLATES AS FLAME - PROOFING AGENTS
William F. Tousignant and Max E. Elder, Midland, Mich., assignors to The Dow Chemical Company, Midland, Mich., a corporation of Delaware
No Drawing. Filed Nov. 2, 1961, Ser. No. 149,529
5 Claims. (Cl. 260—80.5)

This invention relates to flame retardant plastic compositions of flammable alkenyl aromatic resins. More particularly it relates to such compositions that are copolymers of the said alkenyl aromatic resins and certain halogen containing monomeric materials.

By an "alkenyl aromatic resin" is meant a solid polymer of one or more polymerizable alkenyl aromatic compounds. Such polymer comprises in chemically combined form at least 50 percent by weight of at least one alkenyl aromatic compound having the general formula:

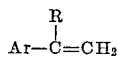

wherein Ar represents an aromatic hydrocarbon radical, or an aromatic halohydrocarbon radical, of the benzene series, and R is hydrogen or the methyl radical. Examples of such alkenyl aromatic resins are the solid homopolymers of styrene, alphamethyl styrene, vinyltoluene, ar-ethylstyrene, vinylxylene, ar-chlorostyrene, ar-isopropyl styrene or ar-tert.butylstyrene; the solid copolymers of two or more of such alkenyl aromatic compounds with one another; and solid copolymers of one or more of such alkenyl aromatic compounds with minor amounts of other readily polymerizable olefinic compounds such as methyl methacrylate or acrylonitrile.

As used herein, the expressions "non-flammable," "flame-proof" and "self extinguishing" means incapable of sustaining a flame until completely burned after a composition has been ignited in an open flame and then removed therefrom. The terms "Self-extinguishing, Class I" and "Self-extinguishing, Class II" have the meaning given them in the Underwriter's Laboratories Burning Test of Plastics, Subject 94, the differentiation between them being that Class I material do not give rise to flaming particles or droplets during the burning test, whereas Class II materials, while self-extinguishing, do give rise to such flaming particles or droplets.

It is known that the halogen content of halogenated organic compounds, particularly or organic bromine derivatives, generally is effective to reduce the flammability of the compound itself and of flammable organic materials intimately admixed therewith. Accordingly, certain bromine containing organic compounds have been employed to render non-flammable a variety of resinous compositions. They have been used either as an intimately admixed additive for the resinous component of the nonflammable composition or as a material copolymerizable with monomers such as styrene in the preparation of the resin.

Generally, however, the use of these materials is attended by certain difficulties. Frequently, the amount required to lend self-extinguishing properties to a given resinous composition is inordinately large and the use of the material is not economically feasible. Furthermore, the amount of a given halogenated compound required may be such that the physical properties of the resinous composition may be seriously and adversely affected. Finally, the resinous compositions incorporating these materials in an amount such that the physical properties of the compositions are reasonably maintained are ordinarily classifiable only as Self-extinguishing, Class II and are, therefore, unacceptable for a variety of applications.

As an example of the type of halogenated compounds that are reasonably effective as agents to provide self-extinguishing properties to a copolymeric compound, compounds of the following general formula may be cited,

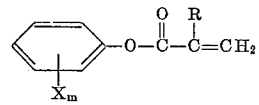

wherein R is hydrogen or the methyl radical, X is chlorine or bromine and m is an integer of a value of from 1 to 5 inclusive. Such compounds are readily prepared and may have a relatively large halogen content. They are copolymerizable with a wide variety of materials including the polymerizable alkenyl aromatic compounds.

A representative compound of high halogen content of the above type is 2,4,6-tribromophenyl acrylate. When this compound is copolymerized with styrene, for example, in an amount equal to about 14 percent by weight of the copolymerizable mixture, the resinous product is self-extinguishing. However, the product cannot be classified as a Self-extinguishing, Class I composition. Nor can it be raised to that classification by an increase in the amount of the 2,4,6-tribromophenyl acrylate employed; copolymers of this material and styrene remain Class II products no matter what relative amounts of the monomers are employed in their preparations.

It has now been discovered that Self-extinguishing, Class II compositions comprising alkenyl aromatic resins containing flame retardant agents of the above type can be upgraded to a Class I category by the addition thereto of small amounts of certain adjunctive, halogen containing flame retardant agents which are themselves incapable of acting alone to give Class I compositions. Specifically, it has been discovered that copolymers of alkenyl aromatic monomers and compounds of the type (A) 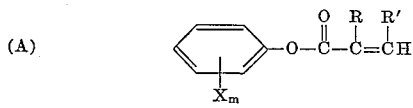

wherein X is chlorine or bromine, m is an integer of from 1 to 5 inclusive, R is hydrogen or the methyl radical and R' is hydrogen, the methyl radical or the group

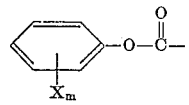

wherein X and m are as above defined may be upgraded to Class I materials by the inclusion in the mixture of comonomers, a small amount of a compound corresponding to the general formula (B) 

wherein R may be hydrogen or the methyl radical and A may be the group

—CH$_2$—CHBr—CH$_2$Br or the group

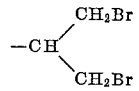

For convenience hereinafter, compounds corresponding to (A) above are referred to as major self-extinguishing agents or fire retardant agents, while those corresponding to (B) are equivalently referred to as minor agents.

In general, the major fire retardant agent will constitute from about 15 to about 18 percent of the total composition. Advantageously, it will be employed in an amount sufficient so that if the minor fire retardant agent were not present the combination of chemically combined alkenyl aromatic compound and major fire retardant agent would be self-extinguishing in the Class II category.

The minor fire retardant agent is employed in a considerably smaller amount relative to the major fire retardant agent. Usually it will be present in an amount equal to from about 0.7 to about 1.7 percent by weight of the total composition.

The minor self-extinguishing agents of the present invention may conveniently be prepared, in known manner, by the direct esterification of the desired bromine containing alcohol with either methacrylic or methacrylic acid or by the action of an acyl halide of either acid on the alcohol.

The major self-extinguishing agents of the invention are conveniently prepared, in known manner, by the esterification of the desired polyhalogenated phenol with the acid chloride of the desired unsaturated acid, as shown in application, Serial No. 142,501, and application, Serial No. 142,502, of William F. Tousignant, filed October 3, 1961, now abandoned.

The resinous compositions contemplated by the present invention may be prepared by any of the conventional techniques employed, for example, in the preparation of polystyrene. The mixture in desired proportion of the alkenyl aromatic monomer and the major and minor self-extinguishing monomers may thus be polymerized in mass, in aqueous suspension or in the form of an emulsion. Similarly, the post polymerization treatment and handling of the compositions are conventional.

Inasmuch as both the major and minor self-extinguishing agents are chemically combined in the resinous composition they show no tendency to migrate to the surface of the composition and cannot be leached therefrom. As a result, the compositions retain their enhanced self-extinguishing characteristics indefinitely.

The self-extinguishing resinous compositions are readily fabricated into useful articles by the conventionally employed methods of compresion molding, extrusion, injection molding and the like. They are possessed of excellent thermal stability and suffer little or no discoloration under the conditions of temperature obtaining in the practice of these fabrication techinques.

It may be particularly noted that the resinous compositions of the present invention exhibit their excellent self-extinguishing characteristics in the form of cellular articles equally as well as in a solid form. Thus, cellular objects of these compositions are also excellently self-extinguishing.

Cellular articles of the present compositions may be prepared by any of the known ways of preparing objects of cellular polyester. For example, they may be employed in the method of U.S. Patent No. 2,669,751 wherein the composition is heat-plastified in an extruder and is mixed with a normally gaseous agent such as methyl chloride or the like under superatmospheric pressure to form a gel which is brought to a temperature between about 60° and 130° C., at which temperature it remains flowable under the conditions employed, then is extruded into the atmosphere wherein the extrudate expands to form a cellular body.

The invention is illustrated by the following non-limiting examples, wherein all parts and percentages are on a weight basis.

EXAMPLE 1

Into a glass pressure bottle there was charged a mixture of 50.4 parts of styrene, 10.0 parts of 2,4,6-tribromophenyl methacrylate, 0.5 part of 2,3-dibromopropyl methacrylate and 0.1 part of ditertiarybutyl peroxide. The air was flushed from the bottle with nitrogen. The bottle was then sealed and placed in an oil bath maintained at a temperature of 110° C. for a period of 20 hours. The resulting polymer was finely ground and devolatilized at 80° C. for 7 hours at a pressure of 1–5 mm. of mercury. Standard test bars were prepared from the polymer. These were found to be self-extinguishing in the Class I category on ignition testing.

The major and minor self-extinguishing agents employed herein were prepared as follows:

2,4,6-tribromophenyl methacryate

Into a reaction flask fitted with a condenser, stirrer and dropping funnel there was charged a mixture of 2317 parts of 2,4,6-tribromophenol, 707 parts of triethylamine and 5320 parts of methylene chloride. From the dropping funnel there was added, with stirring, 728 parts of methacryloyl chloride during 1 hour. At the conclusion of this addition, the reaction mixture was maintained at the reflux temperature of 40° C. for an additional 4 hours.

The reaction mixture was freed from the triethylamine hydrochloride by-product and unreacted 2,4,6-tribromophenol by thorough and sucessive washings with water, dilute caustic soda solution, dilute hydrochloric acid and water.

To the methylene chloride solution of recation there was added a mixture of 2000 parts of water and 1000 parts of methanol. The methylene chloride was distilled from the mixture under a moderate vacuum at about 30° C. A crystalline product was obtained when removal of the methylene chloride was substantially complete. The crystalline product was filtered, washed and dried. There were obtained 2367 parts of white, crystalline 2,4,6-tribromophenyl methacrylate, M.P. 62–63° C.

2,3-dibromopropyl methacrylate

In a reaction flask fitted with a condenser, stirrer and dropping funnel there was charged a mixture of 218 parts of 2,3-dibromo-1-propanol, 101 parts of triethyl amine and 300 parts of methylene chloride. From the dropping funnel there were added 116 parts of methacrylyl chloride with stirring during 1 hour. Stirring of the reaction mixture was continued for 0.5 hour after this addition was completed. The reaction mixture was washed twice with 300 parts of water. The methylene chloride was removed by distillation under reduced pressure and the residual oil was distilled to give 220 parts of 2,3-dibromopropyl methacrylate, B.P. 92–95°/10 mm., $N_D^{25} = 1.5148$.

EXAMPLE 2

According to the method of Example 1, a copolymeric composition was prepared from a mixture of 50.4 parts of styrene and 16 parts of 2,4,6-tribromophenyl acrylate. Test bars prepared therefrom were found to be self-extinguishing in the Class II category on ignition testing.

EXAMPLE 3

The preparation of Example 1 was repeated with the substitution of 0.5 part of 1,3-dibromoisopropyl acrylate for the 2,3-dibromopropyl methacrylate of that example. Standard test bars prepared from the resulting polymer were found to be self-extinguishing in the Class I category.

The minor self-extinguishing agent was prepared in the manner described above for the preparation of 2,3-dibromopropyl methacrylate in Example 1. The reaction mixture consisted of 218 parts of 1,3-dibromo-2-propanol, 101 parts of triethyl amine and 300 parts of methylene chloride. To this was added, as above described, 100 parts of acrylyl chloride. There were obtained 212 parts of 1,3-dibromoisopropyl acrylate, B.P. 78–85° C./1.4 mm.

What is claimed is:

1. A non-flammable thermoplastic polymeric composition comprising in chemically combined form (1) at least 50 percent by weight of at least one alkenyl aromatic compound having the general formula $$\underset{\mathrm{Ar-C=CH_2}}{\overset{\mathrm{R}}{|}}$$

wherein Ar represents an aromatic radical of the group consisting of hydrocarbon and halohydrocarbon radicals of the benzene series and R represents a member of the group consisting of hydrogen and the methyl radical, (2) from about 15 to 18 percent by weight of a compound of the general formula

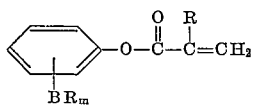

wherein $m$ is an integer from 3 to 5, and R is a member of the group consisting of hydrogen and the methyl radical, and (3) from about 0.7 to about 1.7 percent by weight of a compound of the general formula $$\underset{\mathrm{CH_2=C-C-OA}}{\overset{\mathrm{R\ \ O}}{|\ \ \ ||}}$$

wherein R is a member of the group consisting of hydrogen and the methyl radical and A is a member of the group consisting of the radical —CH$_2$—CHBr—CH$_2$Br and the radical

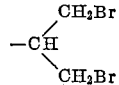

2. A non-flammable thermoplastic polymeric composition comprising in chemically combined form (1) at least 50 percent by weight of at least one alkenyl aromatic compound having the general formula $$\underset{\mathrm{Ar-C=CH_2}}{\overset{\mathrm{R}}{|}}$$

wherein Ar represents an aromatic radical of the group consisting of hydrocarbon and halohydrocarbon radicals of the benzene series and R represents a member of the group consisting of hydrogen and the methyl radical, (2) from about 15 to about 18 percent by weight of 2,4,6-tribromophenyl methacrylate and (3) from about 0.7 to about 1.7 percent by weight of a compound of the general formula $$\underset{\mathrm{CH_2=C-C-OA}}{\overset{\mathrm{R\ \ O}}{|\ \ \ ||}}$$

wherein R is a member of the group consisting of hydrogen and the methyl radical and A is a member of the group consisting of the radical —CH$_2$—CHBr—CH$_2$Br and the radical

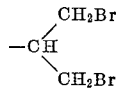

3. A non-flammable thermoplastic polymeric composition comprising in chemically combined form (1) styrene and (2) from about 15 to about 18 percent by weight of 2,4,6-tribromophenyl methacrylate and (3) from about 0.7 to about 1.7 percent by weight of a compound of the general formula $$\underset{\mathrm{CH_2=C-C-OA}}{\overset{\mathrm{R\ \ O}}{|\ \ \ ||}}$$

wherein R is a member of the group consisting of hydrogen and the methyl radical and A is a member of the group consisting of the radical —CH$_2$—CHBr—CH$_2$Br and the radical

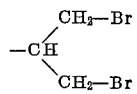

4. A polymeric composition as claimed in claim 3 wherein (3) is 2,3-dibromopropyl methacrylate.

5. A polymeric composition as claimed in claim 3 wherein (3) is 1,3-dibromoisopropyl acrylate.

References Cited by the Examiner

UNITED STATES PATENTS 2,822,378    2/58    Bader _____ 260—479 XR
3,058,929   10/62    Vanderhoff et al. _____ 260—2.5

FOREIGN PATENTS 558,943    6/58    Canada.
1,044,802   11/58    Germany.

OTHER REFERENCES

Rehberg et al.: I, J. Am. Chem. Soc., 72, 5200 (1950).

JOSEPH L. SCHOFER, *Primary Examiner.*

J. R. LIBERMAN, *Examiner.*